(12) United States Patent
Hahn

(10) Patent No.: US 6,631,626 B1
(45) Date of Patent: Oct. 14, 2003

(54) NATURAL GAS LIQUEFACTION WITH IMPROVED NITROGEN REMOVAL

(75) Inventor: Paul R. Hahn, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/217,255

(22) Filed: Aug. 12, 2002

(51) Int. Cl.$^7$ .................................... F25J 3/08
(52) U.S. Cl. ............................ 62/612; 62/618
(58) Field of Search ..................... 62/611, 612, 613, 62/618, 619, 424

(56) References Cited

U.S. PATENT DOCUMENTS

| | | |
|---|---|---|
| 4,150,962 A * | 4/1979 | Colton ........................ 62/17 |
| 4,938,939 A | 7/1990 | Kuznicki |
| 5,964,923 A | 10/1999 | Lokhandwala |
| 5,989,316 A | 11/1999 | Kuznicki et al. |
| 5,993,516 A | 11/1999 | Morris et al. |
| 6,070,429 A | 6/2000 | Low et al. |
| 6,158,240 A | 12/2000 | Low et al. |
| 6,315,817 B1 | 11/2001 | Butwell et al. |
| 6,444,012 B1 * | 9/2002 | Dolan et al. .................. 95/99 |

* cited by examiner

Primary Examiner—Denise L. Esquivel
Assistant Examiner—Malik N. Drake
(74) Attorney, Agent, or Firm—Gary L. Haag

(57) ABSTRACT

Natural gas liquefaction system employing a zeolite adsorbent for removing nitrogen from pretreated natural gas.

62 Claims, 2 Drawing Sheets

NATURAL GAS LIQUEFACTION WITH IMPROVED NITROGEN REMOVAL

BACKGROUND OF THE INVENTION

1. Field of the Invention

This invention concerns a method and an apparatus for removing nitrogen from natural gas streams in a natural gas liquefaction plant.

2. Description of the Prior Art

The cryogenic liquefaction of natural gas is routinely practiced as a means of converting natural gas into a more convenient form for transportation and storage. Such liquefaction reduces the volume by about 600-fold and results in a product which can be stored and transported at near atmospheric pressure.

With regard to ease of storage, natural gas is frequently transported by pipeline from the source of supply to a distant market. It is desirable to operate the pipeline under a substantially constant and high load factor but often the deliverability or capacity of the pipeline will exceed demand while at other times the demand may exceed the deliverability of the pipeline. In order to shave off the peaks where demand exceeds supply or the valleys when supply exceeds demand, it is desirable to store the excess gas in such a manner that it can be delivered when the supply exceeds demand. Such practice allows future demand peaks to be met with material from storage. One practical means for doing this is to convert the gas to a liquefied state for storage and to then vaporize the liquid as demand requires.

The liquefaction of natural gas is of even greater importance when transporting gas from a supply source which is separated by great distances from the candidate market and a pipeline either is not available or is impractical. This is particularly true where transport must be made by ocean-going vessels. Ship transportation in the gaseous state is generally not practical because appreciable pressurization is required to significantly reduce the specific volume of the gas. Such pressurization requires the use of more expensive storage containers.

In order to store and transport natural gas in the liquid state, the natural gas is preferably cooled to −240° F. to −260° F. where the liquefied natural gas (LNG) possesses a near-atmospheric vapor pressure. Numerous systems exist in the prior art for the liquefaction of natural gas in which the gas is liquefied by sequentially passing the gas at an elevated pressure through a plurality of cooling stages whereupon the gas is cooled to successively lower temperatures until the liquefaction temperature is reached. Cooling is generally accomplished by heat exchange with one or more refrigerants such as propane, propylene, ethane, ethylene, methane, nitrogen or combinations of the preceding refrigerants (e.g., mixed refrigerant systems). A liquefaction methodology which is particularly applicable to the current invention employs an open methane cycle for the final refrigeration cycle wherein a pressurized LNG-bearing stream is flashed and the flash vapors (i.e., the flash gas stream(s)) are subsequently employed as cooling agents, recompressed, cooled, combined with the processed natural gas feed stream and liquefied thereby producing the pressurized LNG-bearing stream.

In any liquefaction process producing a pressurized LNG-bearing stream, the presence of nitrogen is problematic because of the solubility of these components in pressurized LNG. Further, elevated concentrations of nitrogen in the open methane cycle can increase refrigeration requirements and result in various operational problems. Thus, the removal of nitrogen is required at some location in the process. One methodology for such removal has been to flash the pressurized LNG-bearing stream and employ the resulting flash gas stream(s) as fuel gas for drivers (e.g., turbines) for refrigerant compressors employed in the liquefaction processes and/or electrical generators. However, gas turbines can only accept a limited range of varying BTU content in the fuel gas. Therefore, conventional schemes for removing nitrogen from a liquefaction process via a fuel gas stream may no longer be practical when the BTU content of the flash gas stream(s) is too low compared to a fuel that is used for start-up of the turbine. Further, fluctuations in fuel gas quality attributed to process upsets may render such conventional methodologies impractical.

OBJECTS AND SUMMARY OF THE INVENTION

It is an object of the present invention to provide a novel system for removing nitrogen from a natural gas stream in a natural gas liquefaction plant.

Other objects and advantages of the invention will be apparent from the written description and drawings.

Accordingly, in one embodiment of the present invention, there is provided a process for liquefying natural gas. The improvement in such process comprises removing nitrogen from the natural gas using a molecular sieve having a pore size in the range of from about 3.5 to about 4.0 angstroms.

In another embodiment of the present invention, there is provided a natural gas liquefaction process comprising the steps of: (a) adsorbing nitrogen from the natural gas, thereby providing a low-nitrogen natural gas stream; (b) cooling at least a portion of the low-nitrogen natural gas stream in a propane chiller, thereby providing a first-stage chilled natural gas stream; (c) cooling at least a portion of the first-stage chilled natural gas stream in an ethylene chiller, thereby providing a second-stage chilled natural gas stream; and (d) using at least a portion of the second-stage chilled natural gas stream as a refrigerant in an open methane cycle.

In a further embodiment of the present invention, there is provided a natural gas liquefaction process comprising the steps of: (a) cooling the natural gas in a propane chiller, thereby providing a first-stage chilled natural gas stream; (b) cooling at least a portion of the first-stage chilled natural gas stream in an ethylene chiller, thereby providing a second-stage chilled natural gas stream; (c) cooling at least a portion of the second-stage chilled natural gas stream in a methane economizer, thereby providing a third-stage chilled natural gas stream; (d) using at least a portion of the third-stage chilled natural gas stream as a refrigerant in the methane economizer; and (e) adsorbing nitrogen from at least a portion of the natural gas used as a refrigerant in the methane economizer, thereby providing a low-nitrogen natural gas stream.

In still another embodiment of the present invention, there is provided an apparatus for liquefying natural gas. The apparatus comprises a pretreatment system operable to remove at least one contaminant from the natural gas and a nitrogen removal system disposed downstream of the pretreatment system and operable to remove nitrogen from the natural gas. The contaminant removed by the pretreatment system is at least one contaminant selected from the group consisting of an acid gas, water, mercury, and combinations thereof. The natural gas removal system includes a molecular sieve having a pore size in the range of from about 3.5 to about 4.0 angstroms.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
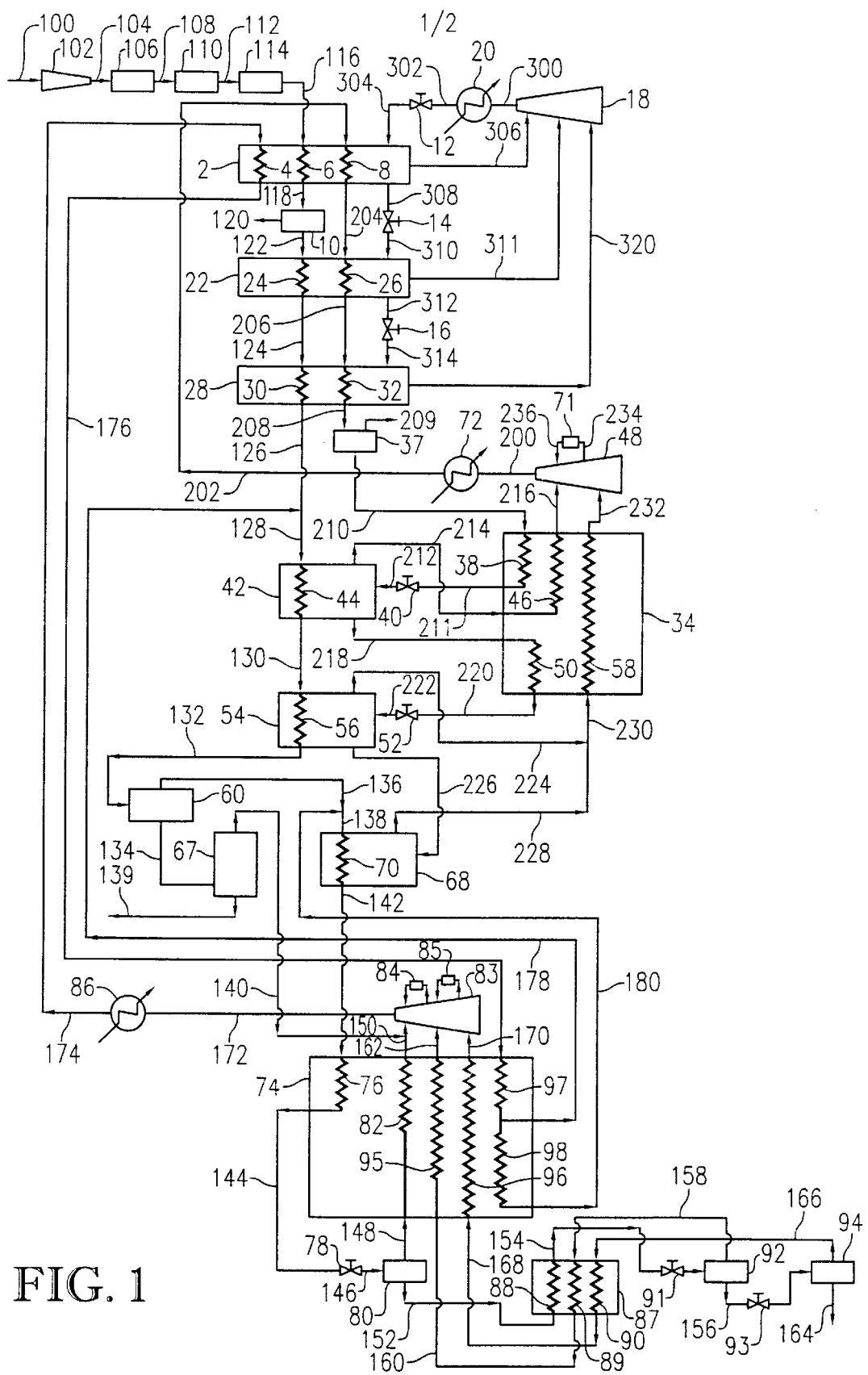
FIG. 1 is a simplified flow diagram of a cascaded refrigeration process for LNG production which employs an open methane refrigeration cycle.

As used herein, the term open-cycle cascaded refrigeration process refers to a cascaded refrigeration process comprising at least one closed refrigeration cycle and one open refrigeration cycle where the boiling point of the refrigerant/cooling agent employed in the open cycle is less than the boiling point of the refrigerating agent or agents employed in the closed cycle(s) and a portion of the cooling duty to condense the compressed open-cycle refrigerant/cooling agent is provided by one or more of the closed cycles. In the current invention, methane or a predominately methane stream is employed as the refrigerant/cooling agent in the open cycle. This stream is comprised of the processed natural gas feed stream and the compressed open methane cycle gas streams.

The design of a cascaded refrigeration process involves a balancing of thermodynamic efficiencies and capital costs. In heat transfer processes, thermodynamic irreversibilities are reduced as the temperature gradients between heating and cooling fluids become smaller, but obtaining such small temperature gradients generally requires significant increases in the amount of heat transfer area, major modifications to various process equipment and the proper selection of flowrates through such equipment so as to ensure that both flowrates and approach and outlet temperatures are compatible with the required heating/cooling duty.

One of the most efficient and effective means of liquefying natural gas is via an optimized cascade-type operation in combination with expansion-type cooling. Such a liquefaction process is comprised of the sequential cooling of a natural gas stream at an elevated pressure, for example about 625 psia, by sequentially cooling the gas stream by passage through a multistage propane cycle, a multistage ethane or ethylene cycle, and an open-end methane cycle which utilizes a portion of the feed gas as a source of methane and which includes therein a multistage expansion cycle to further cool the same and reduce the pressure to near-atmospheric pressure. In the sequence of cooling cycles, the refrigerant having the highest boiling point is utilized first followed by a refrigerant having an intermediate boiling point and finally by a refrigerant having the lowest boiling point. As used herein, the term "propane chiller" shall denote a cooling system that employs a refrigerant having a boiling range the same as, or similar to, that of propane or propylene. As used herein, the term "ethylene chiller" shall denote a cooling system that employs a refrigerant having a boiling range the same as, or similar to, that of ethane or ethylene. As used herein, the terms "upstream" and "downstream" shall be used to describe the relative positions of various components of a natural gas liquefaction plant along the flow path of natural gas through the plant.

Various pretreatment steps provide a means for removing undesirable components, such as acid gases, mercaptan, mercury, and moisture from the natural gas feed stream delivered to the facility. The composition of this gas stream may vary significantly. As used herein, a natural gas stream is any stream principally comprised of methane which originates in major portion from a natural gas feed stream, such feed stream for example containing at least 85% by volume, with the balance being ethane, higher hydrocarbons, nitrogen, carbon dioxide and a minor amounts of other contaminants such as mercury, hydrogen sulfide, and mercaptan. The pretreatment steps maybe separate steps located either upstream of the cooling cycles or located downstream of one of the early stages of cooling in the initial cycle. The following is a non-inclusive listing of some of the available means which are readily available to one skilled in the art. Acid gases and to a lesser extent mercaptan are routinely removed via a chemical reaction process employing an aqueous amine-bearing solution. This treatment step is generally performed upstream of the cooling stages in the initial cycle. A major portion of the water is routinely removed as a liquid via two-phase gas-liquid separation following gas compression and cooling upstream of the initial cooling cycle and also downstream of the first cooling stage in the initial cooling cycle. Mercury is routinely removed via mercury sorbent beds. Residual amounts of water and acid gases are routinely removed via the use of properly selected sorbent beds such as regenerable molecular sieves.

The pretreated natural gas feed stream is generally delivered to the liquefaction process at an elevated pressure or is compressed to an elevated pressure, that being a pressure greater than 500 psia, preferably about 500 psia to about 900 psia. The stream temperature is typically near ambient to slightly above ambient. A representative temperature range being 60° F. to 138° F.

As previously noted, the natural gas feed stream is cooled in a plurality of multistage (for example, three) cycles or steps by indirect heat exchange with a plurality of refrigerants, preferably three. The overall cooling efficiency for a given cycle improves as the number of stages increases but this increase in efficiency is accompanied by corresponding increases in net capital cost and process complexity. The feed gas is preferably passed through an effective number of refrigeration stages, nominally two, preferably two to four, and more preferably three stages, in the first closed refrigeration cycle utilizing a relatively high boiling refrigerant. Such refrigerant is preferably comprised in major portion of propane, propylene or mixtures thereof, more preferably propane, and most preferably the refrigerant consists essentially of propane. Thereafter, the processed feed gas flows through an effective number of stages, nominally two, preferably two to four, and more preferably two or three, in a second closed refrigeration cycle in heat exchange with a refrigerant having a lower boiling point. Such refrigerant is preferably comprised in major portion of ethane, ethylene or mixtures thereof, more preferably ethylene, and most preferably the refrigerant consists essentially of ethylene. Each cooling stage comprises a separate cooling zone. As previously noted, the processed natural gas feed stream is combined with one or more recycle streams (i.e., compressed open methane cycle gas streams) at various locations in the second cycle thereby producing a liquefaction stream. In the last stage of the second cooling cycle, the liquefaction stream is condensed (i.e., liquefied) in major portion, preferably in its entirety thereby producing a pressurized LNG-bearing stream. Generally, the process pressure at this location is only slightly lower than the pressure of the pretreated feed gas to the first stage of the first cycle.

Generally, the natural gas feed stream will contain such quantities of $C_2+$ components so as to result in the formation of a $C_2+$ rich liquid in one or more of the cooling stages. This liquid is removed via gas-liquid separation means, preferably one or more conventional gas-liquid separators. Generally, the sequential cooling of the natural gas in each stage is controlled so as to remove as much as possible of the $C_2$ and higher molecular weight hydrocarbons from the gas to produce a gas stream predominating in methane and a liquid stream containing significant amounts of ethane and heavier components. An effective number of gas/liquid separation means are located at strategic locations downstream of the cooling zones for the removal of liquids streams rich in $C_2+$ components. The exact locations and number of gas/liquid separation means, preferably conventional gas/liquid separators, will be dependant on a number of operating parameters, such as the $C_2+$ composition of the natural gas feed stream, the desired BTU content of the LNG product, the value of the $C_2+$ components for other applications and other factors routinely considered by those skilled in the art of LNG plant and gas plant operation. The $C_2+$ hydrocarbon stream or streams may be demethanized via a single stage flash or a fractionation column. In the latter case, the resulting methane-rich stream can be directly returned at pressure to the liquefaction process. In the former case, this methane-rich stream can be repressurized and recycle or can be used as fuel gas. The $C_2+$ hydrocarbon stream or streams or the demethanized $C_2+$ hydrocarbon stream may be used as fuel or may be further processed such as by fractionation in one or more fractionation zones to produce individual streams rich in specific chemical constituents (ex., $C_2$, $C_3$, $C_4$ and $C_5+$ ).

The pressurized LNG-bearing stream is then further cooled in a third cycle or step referred to as the open methane cycle via contact in a main methane economizer with flash gases (i.e., flash gas streams) generated in this third cycle in a manner to be described later and via expansion of the pressurized LNG-bearing stream to near atmospheric pressure. During this expansion, the pressurized LNG-bearing stream is cooled via at least one, preferably two to four, and more preferably three expansions where each expansion employs as a pressure reduction means either Joule-Thomson expansion valves or hydraulic expanders. The expansion is followed by a separation of the gas-liquid product with a separator. When a hydraulic expander is employed and properly operated, the greater efficiencies associated with the recovery of power, a greater reduction in stream temperature, and the production of less vapor during the flash step will frequently more than off-set the more expensive capital and operating costs associated with the expander. In one embodiment, additional cooling of the pressurized LNG-bearing stream prior to flashing is made possible by first flashing a portion of this stream via one or more hydraulic expanders and then via indirect heat exchange means employing said flash gas stream to cool the remaining portion of the pressurized LNG-bearing stream prior to flashing. The warmed flash gas stream is then recycled via return to an appropriate location, based on temperature and pressure considerations, in the open methane cycle and will be recompressed.

When the pressurized LNG-bearing stream, preferably a liquid stream, entering the third cycle is at a preferred pressure of about 600 psia, representative flash pressures for a three stage flash process are about 190, 61, and 24.7 psia. Flashing of the pressurized LNG-bearing stream, preferably a liquid stream, to near atmospheric pressure produces an LNG product possessing a temperature of $-240°$ F. to $-260°$ F.

Critical to the liquefaction of natural gas in a cascaded process is the use of one or more refrigerants for transferring heat energy from the natural gas stream to the refrigerant and ultimately transferring said heat energy to the environment. In essence, the overall refrigeration system functions as a heat pump by removing heat energy from the natural gas stream as the stream is progressively cooled to lower and lower temperatures.

The liquefaction process may use one of several types of cooling which include but is not limited to (a) indirect heat exchange, (b) vaporization, and (c) expansion or pressure reduction. Indirect heat exchange, as used herein, refers to a process wherein the refrigerant cools the substance to be cooled without actual physical contact between the refrigerating agent and the substance to be cooled. Specific examples of indirect heat exchange means include heat exchange undergone in a shell-and-tube heat exchanger, a core-in-kettle heat exchanger, and a brazed aluminum plate-fin heat exchanger. The physical state of the refrigerant and substance to be cooled can vary depending on the demands of the system and the type of heat exchanger chosen. Thus, a shell-and-tube heat exchanger will typically be utilized where the refrigerating agent is in a liquid state and the substance to be cooled is in a liquid or gaseous state or when one of the substances undergoes a phase change and process conditions do not favor the use of a core-in-kettle heat exchanger. As an example, aluminum and aluminum alloys are preferred materials of construction for the core but such materials may not be suitable for use at the designated process conditions. A plate-fin heat exchanger will typically be utilized where the refrigerant is in a gaseous state and the substance to be cooled is in a liquid or gaseous state. Finally, the core-in-kettle heat exchanger will typically be utilized where the substance to be cooled is liquid or gas and the refrigerant undergoes a phase change from a liquid state to a gaseous state during the heat exchange.

Vaporization cooling refers to the cooling of a substance by the evaporation or vaporization of a portion of the substance with the system maintained at a constant pressure. Thus, during the vaporization, the portion of the substance which evaporates absorbs heat from the portion of the substance which remains in a liquid state and hence, cools the liquid portion.

Finally, expansion or pressure reduction cooling refers to cooling which occurs when the pressure of a gas, liquid or a two-phase system is decreased by passing through a pressure reduction means. In one embodiment, this expansion means is a Joule-Thomson expansion valve. In another embodiment, the expansion means is either a hydraulic or gas expander. Because expanders recover work energy from the expansion process, lower process stream temperatures are possible upon expansion.

Figure 2:
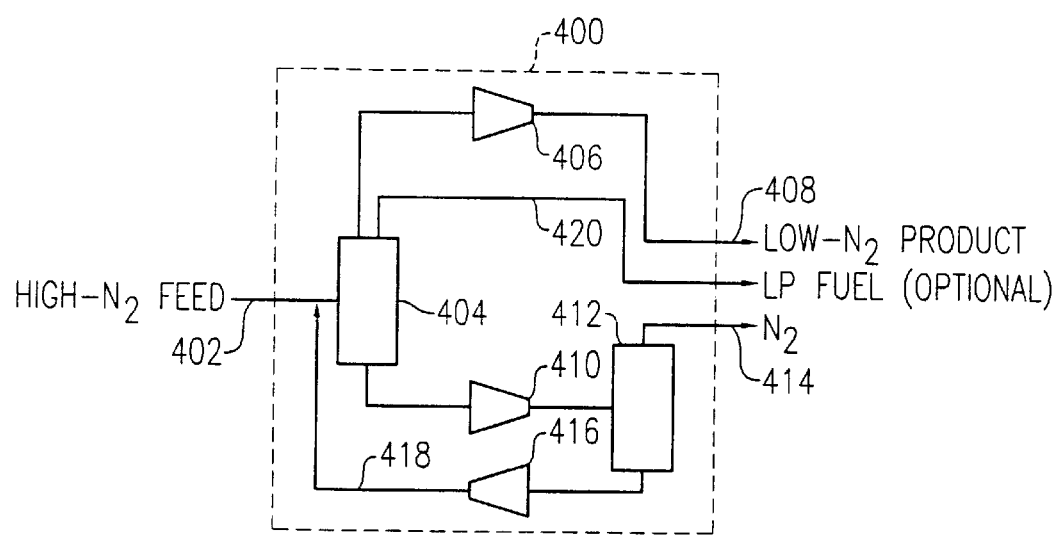
FIG. 2 is a simplified flow diagram of a preferred embodiment of the nitrogen removal system suitable for removing nitrogen from natural gas in a natural gas liquefaction plant.

The flow schematic and apparatus set forth in FIG. 1 is a preferred embodiment of the open-cycle cascaded liquefaction process and is set forth for illustrative purposes. Purposely omitted from this embodiment is a nitrogen removal system because the location of such system in the liquefaction plant can vary depending on various feed and operating parameters. FIG. 2 generally depicts a nitrogen removal system suitable for use in the cascade liquefaction process of FIG. 1. The ensuing discussion will address the integration of the process methodologies and associated apparatus depicted in FIG. 2 into the process methodology and apparatus depicted in FIG. 1. Those skilled in the art will recognized that FIGS. 1 and 2 are schematics only and therefore, many items of equipment that would be needed in a commercial plant for successful operation have been omitted for the sake of clarity. Such items might include, for example, compressor controls, flow and level measurements and corresponding controllers, temperature and pressure controls, pumps, motors, filters, additional heat exchangers, and valves, etc. These items would be provided in accordance with standard engineering practice.

To facilitate an understanding of FIGS. 1 and 2, the following numbering nomenclature was employed. Items numbered 1 thru 99 are process vessels and equipment depicted in FIG. 1 which are directly associated with the liquefaction process excluding items directly associated with nitrogen removal. Items numbered 100 thru 199 correspond to flow lines or conduits depicted in FIG. 1 which contain methane in major portion. Items numbered 200 thru 299 correspond to flow lines or conduits depicted in FIG. 1 which contain the refrigerant ethylene. Items numbered 300–399 correspond to flow lines or conduits depicted in FIG. 1 which contain the refrigerant propane. Items number 400–499 correspond to process vessels, equipment, and flow lines or conduits depicted in FIG. 2.

Referring to FIG. 1, a natural gas feed stream, as previously described, enters conduit 100 from a natural gas pipeline. In an inlet compressor 102, the natural gas is compressed and air cooled so that the natural gas exiting compressor 102 has a pressure generally in the range of from about 500 psia to about 800 psia and a temperature generally in the range of from about 75° F. to about 175° F. The natural gas then flows to an acid gas removal unit 106 via conduit 104. Acid gas removal unit 106 preferably employs an amine solvent (e.g., Diglycol Amine) to remove acid gasses such as $CO_2$ and $H_2S$. Preferably, acid gas removal unit 106 is operable to remove $CO_2$ down to less than 50 ppmv and $H_2S$ down to less than 2 ppmv. After acid gas removal, the natural gas is transferred, via a conduit 108, to a dehydration unit 110 that is operable to remove substantially all water from the natural gas. Dehydration unit preferably employs a multi-bed regenerable molecular sieve system for drying the natural gas. The dried natural gas can then be passed to a mercury removal system 114 via conduit 112. Mercury removal system 114 preferably employs at least one fixed bed vessel containing a sulfur impregnated activated carbon to remove mercury from natural gas.

The resulting pretreated natural gas is introduced to the liquefaction system through conduit 116. Gaseous propane is compressed in multistage compressor 18 driven by a gas turbine driver which is not illustrated. The three stages preferably form a single unit although they may be separate units mechanically coupled together to be driven by a single driver. Upon compression, the compressed propane is passed through conduit 300 to cooler 20 where it is liquefied. A representative pressure and temperature of the liquefied propane refrigerant prior to flashing is about 116° F. and about 190 psia. Although not illustrated in FIG. 1, it is preferable that a separation vessel be located downstream of cooler 20 and upstream of expansion valve 12 for the removal of residual light components from the liquefied propane. Such vessels may be comprised of a single-stage gas liquid separator or maybe more sophisticated and comprised of an accumulator section, a condenser section and an absorber section, the latter two of which may be continuously operated or periodically brought on-line for removing residual light components from the propane. The stream from this vessel or the stream from cooler 20, as the case may be, is pass through conduit 302 to a pressure reduction means such as a expansion valve 12 wherein the pressure of the liquefied propane is reduced thereby evaporating or flashing a portion thereof. The resulting two-phase product then flows through conduit 304 into high-stage propane chiller 2 for indirect heat exchange with gaseous methane refrigerant introduced via conduit 174, natural gas feed introduced via conduit 116, and gaseous ethylene refrigerant introduced via conduit 202 via indirect heat exchange means 4, 6 and 8, thereby producing cooled gas streams respectively transported via conduits 176, 118 and 204.

The flashed propane gas from chiller 2 is returned to compressor 18 through conduit 306. This gas is fed to the high stage inlet port of compressor 18. The remaining liquid propane is passed through conduit 308, the pressure further reduced by passage through a pressure reduction means, illustrated as expansion valve 14, whereupon an additional portion of the liquefied propane is flashed. The resulting two-phase stream is then fed to chiller 22 through conduit 310 thereby providing a coolant for chiller 22.

The cooled natural gas feed stream from chiller 2 flows via conduit 118 to a knock-out vessel 10 wherein gas and liquid phases are separated. The liquid phase which is rich in C3+ components is removed via conduit 120. The gaseous phase is removed via conduit 122 and conveyed to propane chiller 22. Ethylene refrigerant is introduced to chiller 22 via conduit 204. In the chiller, the processed natural gas stream and an ethylene refrigerant stream are respectively cooled via indirect heat exchange means 24 and 26 thereby producing a cooled processed natural gas stream and an ethylene refrigerant stream via conduits 124 and 206. The thus evaporated portion of the propane refrigerant is separated and passed through conduit 311 to the intermediate-stage inlet of compressor 18. Liquid propane is passed through conduit 312, the pressure further reduced by passage through a pressure reduction means, illustrated as expansion valve 16, whereupon an additional portion of liquefied propane is flashed. The resulting two-phase stream is then fed to chiller 28 through conduit 314 thereby providing coolant to chiller 28.

As illustrated in FIG. 1, the cooled processed natural gas stream flows from the intermediate-stage propane chiller 22 to the low-stage propane chiller/condenser 28 via conduit 124. In this chiller, the stream is cooled via indirect heat exchange means 30. In a like manner, the ethylene refrigerant stream flows from the intermediate-stage propane chiller 22 to the low-stage propane chiller/condenser 28 via conduit 206. In the latter, the ethylene-refrigerant is condensed via an indirect heat exchange means 32 in nearly its entirety. The vaporized propane is removed from the low-stage propane chiller/condenser 28 and returned to the low-stage inlet at the compressor 18 via conduit 320. Although FIG. 1 illustrates cooling of streams provided by conduits 124 and 206 to occur in the same vessel, the chilling of stream 124 and the cooling and condensing of stream 206 may respectively take place in separate process vessels (ex., a separate chiller and a separate condenser, respectively). In an alternative embodiment of the present invention, dehydration unit 110 and mercury removal system 114 can be located downstream of high-stage chiller 2 and upstream of intermediate-stage chiller 22. In certain instances, the cooling of the natural gas in chiller 2 prior to water and mercury removal facilitates such removal.

As illustrated in FIG. 1, a portion of the cooled compressed open methane cycle gas stream is provided via conduit 178, combined with the processed natural gas feed stream exiting the low-stage propane chiller via conduit 126 thereby forming a liquefaction stream and this stream is then introduced to the high-stage ethylene chiller 42 via conduit 128. Ethylene refrigerant exits the low-stage propane chiller 28 via conduit 208 and is fed to a separation vessel 37 wherein light components are removed via conduit 209 and condensed ethylene is removed via conduit 210. The separation vessel is analogous to the earlier discussed for the removal of light components from liquefied propane refrigerant and may be a single-stage gas/liquid separator or may be a multiple stage operation resulting in a greater selectivity of the light components removed from the system. The ethylene refrigerant at this location in the process is generally at a temperature of about −24° F. and a pressure of about 285 psia. The ethylene refrigerant via conduit 210 then flows to the main ethylene economizer 34 wherein it is cooled via indirect heat exchange means 38 and removed via conduit 211 and passed to a pressure reduction means such as an expansion valve 40 whereupon the refrigerant is flashed to a preselected temperature and pressure and fed to the high-stage ethylene chiller 42 via conduit 212. Vapor is removed from this chiller via conduit 214 and routed to the main ethylene economizer 34 wherein the vapor functions as a coolant via indirect heat exchange means 46. The ethylene vapor is then removed from the ethylene economizer via conduit 216 and feed to the high-stage inlet on the ethylene compressor 48. The ethylene refrigerant which is not vaporized in the high-stage ethylene chiller 42 is removed via conduit 218 and returned to the ethylene main economizer 34 for further cooling via indirect heat exchange means 50, removed from the main ethylene economizer via conduit 220 and flashed in a pressure reduction means illustrated as expansion valve 52 whereupon the resulting two-phase product is introduced into the low-stage ethylene chiller 54 via conduit 222. The liquefaction stream is removed from the high-stage ethylene chiller 42 via conduit 130 and directly fed to the low-stage ethylene chiller 54 wherein it undergoes additional cooling and partial condensation via indirect heat exchange means 56. The resulting two-phase stream then flows via conduit 132 to a two phase separator 60 from which is produced a methane-rich vapor stream via conduit 136 and via conduit 134, a liquid stream rich in $C_2+$ components which is subsequently flashed or fractionated in vessel 67 thereby producing via conduit 139 a heavies stream and a second methane-rich stream which is transferred via conduit 140 and after combination with a second stream via conduit 150 is fed to the high pressure inlet port on the methane compressor 83.

The stream in conduit 136 and a cooled compressed open methane cycle gas stream provided via conduit 180 are combined and fed via conduit 138 to the low-stage ethylene condenser 68 wherein this stream exchanges heat via indirect heat exchange means 70 with the liquid effluent from the low-stage ethylene chiller 54 which is routed to the low-stage ethylene condenser 68 via conduit 226. In condenser 68, the combined streams are condensed and produced from condenser 68 via conduit 142 is a pressurized LNG-bearing stream. The vapor from the low-stage ethylene chiller 54 via conduit 224 and low-stage ethylene condenser 68 via conduit 228 are combined and routed via conduit 230 to the main ethylene economizer 34 wherein the vapors function as a coolant via indirect heat exchange means 58. The stream is then routed via conduit 232 from the main ethylene economizer 34 to the low-stage side of the ethylene compressor 48. As noted in FIG. 1, the compressor effluent from vapor introduced via the low-stage side is removed via conduit 234, cooled via inter-stage cooler 71 and returned to compressor 48 via conduit 236 for injection with the high-stage stream present in conduit 216. Preferably, the two-stages are a single module although they may each be a separate module and the modules mechanically coupled to a common driver. The compressed ethylene product from the compressor is routed to a downstream cooler 72 via conduit 200. The product from the cooler flows via conduit 202 and is introduced, as previously discussed, to the high-stage propane chiller 2.

The pressurized LNG-bearing stream, preferably a liquid stream in its entirety, in conduit 142 is generally at a temperature of about −125° F. and about 615 psia. This stream passes via conduit 142 through the main methane economizer 74 wherein the stream is further cooled by indirect heat exchange means 76 as hereinafter explained. From the main methane economizer 74 the pressurized LNG-bearing stream passes through conduit 144 and its pressure is reduced by a pressure reductions means which is illustrated as expansion valve 78, which of course evaporates or flashes a portion of the gas stream thereby generating a flash gas stream. The flashed stream is then passed to methane high-stage flash drum 80 where it is separated into a flash gas stream discharged through conduit 148 and a liquid phase stream (i.e., pressurized LNG-bearing stream) discharged through conduit 152. The flash gas stream is then transferred to the main methane economizer via conduit 148 wherein the stream functions as a coolant via indirect heat exchange means 82. The flash gas stream (i.e., warmed flash gas stream) exits the main methane economizer via conduit 150 where it is combined with a gas stream delivered by conduit 140. These streams are then fed to the low pressure side of the high pressure stage of compressor 83. The liquid phase in conduit 152 is passed through a second methane economizer 87 wherein the liquid is further cooled via indirect heat exchange means 88 by a downstream flash gas stream. The cooled liquid exits the second methane economizer 87 via conduit 154 and is expanded or flashed via pressure reduction means illustrated as expansion valve 91 to further reduce the pressure and at the same time, evaporate a second portion thereof. This flash gas stream is then passed to intermediate-stage methane flash drum 92 where the stream is separated into a flash gas stream passing through conduit 158 and a liquid phase stream passing through conduit 156. The flash gas stream flows through conduit 158 to the second methane economizer 87 wherein the gas cools the liquid introduced to 87 via conduit 152 via indirect heat exchanger means 89. Conduit 160 serves as a flow conduit between indirect heat exchange means 89 in the second methane economizer 87 and the indirect heat exchange means 95 in the main methane economizer 74. The warmed flash gas stream leaves the main methane economizer 74 via conduit 162 which is connected to the inlet to the low pressure side of the intermediate stage of methane compressor 83. The liquid phase exiting the intermediate stage flash drum 92 via conduit 156 is further reduced in pressure, preferably to about 25 psia, by passage through a pressure reduction means illustrated as a expansion valve 93. Again, a third portion of the liquefied gas is evaporated or flashed. The fluids from the expansion valve 93 are passed to final or low stage flash drum 94. In flash drum 94, a vapor phase is separated as a flash gas stream and passed through conduit 166 to the second methane economizer 87 wherein the flash gas stream functions as a coolant via indirect heat exchange means 90, exits the second methane economizer via conduit 168 which is connected to the first methane economizer 74 wherein the flash gas stream functions as a coolant via indirect heat exchange means 96 and ultimately leaves the first methane economizer via conduit 170 which is connected to the low side of the low pressure stage of compressor 83. The liquefied natural gas product (i.e., the LNG stream) from flash drum 94 which is at approximately atmospheric pressure is passed through conduit 164 to the storage unit. The low pressure, low temperature LNG boil-off vapor stream from the storage unit is preferably recovered by combining such stream with the low pressure flash gases present in either conduits 166, 168, or 170; the selected conduit being based on a desire to match gas stream temperatures as closely as possible.

As shown in FIG. 1, the high, intermediate and low stages of compressor 83 are preferably combined as single unit. However, each stage may exist as a separate unit where the units are mechanically coupled together to be driven by a single driver. The compressed gas from the low-stage section passes through an inter-stage cooler 85 and is combined with the intermediate pressure gas in conduit 162 prior to the second-stage of compression. The compressed gas from the intermediate stage of compressor 83 is passed through an inter-stage cooler 84 and is combined with the high pressure gas provided via conduits 140 and 150 prior to the third-stage of compression. The compressed gas (i.e., compressed open methane cycle gas stream) is discharged from high stage methane compressor through conduit 172, is cooled in cooler 86 and is routed to the high pressure propane chiller 2 via conduit 174 as previously discussed. The stream is cooled in chiller 2 via indirect heat exchange means 4 and flows to the main methane economizer via conduit 176. As used herein and previously noted, compressor also refers to each stage of compression and any equipment associated with interstage cooling.

As illustrated in FIG. 1, the compressed open methane cycle gas stream from chiller 2 which enters the main methane economizer 74 undergoes cooling in its entirety via flow through indirect heat exchange means 97. A portion of this cooled stream is then removed via conduit 178 and combined with the processed natural gas feed stream upstream of the first stage (i.e., high pressure) of ethylene cooling. The remaining portion of this cooled stream undergoes further cooling via indirect heat transfer mean 98 in the main methane economizer and is produced therefrom via conduit 180. This stream is combined with the above cited combined stream at a location upstream of the final stage (i.e., low pressure) of ethylene cooling and this liquefaction stream then undergoes liquefaction in major portion in the ethylene condenser 68 via flow through indirect heat exchange means 70.

Referring now to FIG. 2, a nitrogen removal system 400 is operable to remove nitrogen from a methane-containing feed entering through a feed conduit 402. The feed from conduit 402 initially enters an adsorption column 404 that contains a nitrogen selective zeolite adsorbent. From the top of column 404, a methane-rich low-$N_2$ product is recovered, compressed in a product compressor 406, and discharged from nitrogen removal system 400 via a product conduit 408. From the bottom of column 404, a $N_2$-rich waste stream is recovered and compressed in a compressor 410. The compressed $N_2$-rich waste stream is then conducted to an adsorption column 412 that contains a methane selective adsorbent. From the top of column 412, a purified $N_2$ waste stream is recovered and discharged from nitrogen removal system 400 via conduit 414. From the bottom of column 412, a recycle methane stream is recovered, compressed in a compressor 416, and recycled to feed conduit 402 via a recycle conduit 418. In an optional configuration, a low pressure fuel can be recovered from the top of column 404 and transported out of nitrogen removal system via conduit 420.

The nitrogen selective adsorbent employed in adsorption column 404 preferably comprises a zeolite having a pore size that is in the range of from about 3.5 to about 4.0 angstroms, more preferably in the range of from about 3.6 to about 3.8 angstroms, still more preferably in the range of from 3.65 to 3.75 angstroms, and most preferably about 3.7 angstroms. The zeolite of the nitrogen selective adsorbent is preferably a crystalline titanium silicate molecular sieve identified in terms of mole ratios of oxides as follows:

wherein M is at least one cation having a valence n, y is from 1.0 to 100, and z is from 0 to 100. Preferably, the zeolite of the nitrogen selective adsorbent is selected from the group consisting of ETS-4, BaETS-4, CTS-1, and mixtures thereof. ETS-4 is described in detail in U.S. Pat. No. 4,938,939, the entire disclosure of which is expressly incorporated herein by reference. BaETS-4 is described in detail in U.S. Pat. No. 5,989,316, the entire disclosure of which is expressly incorporated herein by reference. CTS-1 is described in detail in U.S. Pat. No. 6,315,817, the entire disclosure of which is expressly incorporated herein by reference.

The zeolite of the nitrogen selective adsorbent employed in column 404 can be incorporated with another material resistant to temperatures and other conditions employed in column 404. Such materials include inorganic materials such as clays, silica, and/or metal oxides. The latter may be either naturally occurring or in the form of gelatinous precipitates or gels including mixtures of silica and metal oxides. Normally, crystalline materials have been incorporated into naturally occurring clays, e.g., bentonite and kaolin to improve the crush strength of the adsorbent under commercial operating conditions. These materials, i.e., clays, oxides, etc., function as binders for the adsorbent. It is desirable to provide an adsorbent having good crush strength because the adsorbent may be subjected to rough handling which tends to break the adsorbent down into powder-like materials which cause problems in processing. These clay binders have been employed for the purpose of improving the crush strength of the adsorbent.

Naturally occurring clays that can be composited with the crystalline titanium silicate described herein include the smectite, palygorskite, and kaolin families, which families include the montmorillonites such as sub-bentonites, attapulgite and the kaolins in which the main constituent is halloysite, kaolinite, dickite, nacrite, or anauxite. Such clays can be used in the raw state as originally mined or initially subjected to calcination, acid treatment or chemical modification. In addition to the foregoing materials, the crystalline titanium silicate may be composited with a porous matrix material such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of the zeolite and inorganic metal oxide can vary widely with the zeolite content ranging from about one to about 99 percent by weight, and more usually in the range of from about 80 to about 90 percent by weight of the composite.

The methane selective adsorbent employed in adsorption column 412 preferably comprises either a crystalline aluminosilicate zeolite (e.g., 13X) or a high aluminum X zeolite having a silicon-to-aluminum ratio of about one or an amorphous adsorbent (e.g., silica gel or carbon). The most preferred methane adsorbent is carbon.

The adsorption performed in adsorption columns 404 and 412 can be performed by virtually any known adsorption process such as, for example, pressure swing adsorption (PSA), thermal swing, displacement purge, or nonadsorbable purge (i.e., partial pressure reduction). However, the process of the present invention can be advantageously performed using a pressure swing cycle. Pressure swing cycles are well known in the art. It is preferred for the adsorption in column 404 to be "rate" PSA that takes advantage of the differing adsorption rates of nitrogen and methane by the nitrogen selective adsorbent. Preferably, the nitrogen selective adsorbent employed in column 404 will adsorb nitrogen at a rate that is five to 25 times faster than the rate at which it adsorbs methane. During adsorption in column 404, it is preferred for the temperature in column 404 to be maintained in the range of from about −50° to about 100° F., more preferably from 0° to 70° F. The adsorption pressure in column 404 is preferably in the range of from about 20 psia to about 2,000 psia, more preferably from about 100 psia to about 1,500 psia, and most preferably from 500 psia to 1,000 psia. During desorption in column 404, the temperature may be maintained in the range described above. However, during nitrogen desorption in column 404 it is preferred for the pressure in column to be less than half of the adsorption pressure, preferably less than 20 percent of the adsorption pressure. The desorption pressure is preferably in the range of from about one psia to about 150 psia, more preferably from about five psia to about 50 psia, and most preferably from five psia to 25 psia.

During methane adsorption in column 412, it is preferred for the temperature in column 412 to be maintained in the range of from about −30° to about 140° F., more preferably 70° to 120° F. The adsorption pressure in column 412 is preferably maintained in the range of from about one psia to about 200 psia, more preferably from five to 60 psia.

Referring now to FIGS. 1 and 2 in combination, nitrogen removal system 400, shown in FIG. 2, can be advantageously employed at one or more selected locations of the natural gas liquefaction system shown in FIG. 1 to remove nitrogen from the pretreated natural gas. Nitrogen removal system 400 is preferably disposed downstream of acid gas removal unit 106 and upstream of the high pressure inlet port of methane compressor 83. Thus, feed conduit 402 and product conduit 408 of nitrogen removal system 400 can be fluidly coupled to one, or any combination, of conduits 108, 112, 116, 118, 122, 124, 126, 128, 130, 132, 136, 138, 142, 144, 146, 148, and 150. It is preferred for nitrogen removal system 400 to be disposed downstream of acid gas removal unit 106 to avoid adsorption inefficiencies in adsorption column 404 which can be caused by co-adsorption of acid gasses (particularly $H_2S$ or $CO_2$) present in the high-$N_2$ feed conducted to nitrogen removal system 400. It is preferred for nitrogen removal system 400 to be disposed upstream of the high pressure inlet port of methane compressor 83 because the temperature and pressure of the natural gas (vapor or liquid) downstream of the high pressure inlet port of methane compressor 83 are less than ideal for nitrogen adsorption in adsorption column 404.

Most preferably, nitrogen removal system 400 is located downstream of mercury removal system 114. Such a configuration allows for acid gasses, water, and/or mercury to be removed from the natural gas feed prior to nitrogen removal, thereby eliminating nitrogen removal inefficiencies caused by co-adsorption of such contaminants. Thus, it may be particularly advantageous to dispose nitrogen removal system 400 in conduit 116. Another, particularly advantageous location for nitrogen removal system 400 is in conduit 150. Such location may be advantageous because the nitrogen concentration in the natural gas at this point is substantially higher than at upstream locations. Thus, less fluid would need to be processed in nitrogen removal system 400 if it were disposed in conduit 150.

In an alternative embodiment of the present invention, nitrogen removal system 400 can be used to simultaneously remove $CO_2$ and nitrogen from natural gas. If such a configuration is desired, acid gas removal unit 106 maybe eliminated, so long as the natural gas feed entering conduit 100 contains substantially no (or permissibly low levels of) acid gasses other than $CO_2$ (e.g., $H_2S$). If the natural gas feed entering conduit 100 contains undesirably high levels of acid gasses than other $CO_2$, acid gas removal unit 106 must be used, but it is preferred for an amine solvent that is selective for non-$CO_2$ acid gasses to be employed in acid gas removal unit 106.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a process for liquefying natural gas, the improvement comprising:

(a) removing nitrogen from the natural gas using a molecular sieve having a pore size in the range of from about 3.5 to about 4.0 angstroms;

(b) using at least a portion of the natural gas as a refrigerant in a methane economizer; and (c) downstream of the molecular sieve, compressing at least a portion of the natural gas used as a refrigerant.

2. A process according to claim 1, step (a) including adsorbing the nitrogen with the molecular sieve.

3. A process according to claim 2; and (d) desorbing the nitrogen from the molecular sieve.

4. A process according to claim 3, steps (a) and (b) being steps of a pressure swing adsorption process.

5. A process according to claim 1; and (e) upstream of the molecular sieve, removing an acid gas from the natural gas.

6. A process according to claim 1; and (f) upstream of the molecular sieve, removing water from the natural gas.

7. A process according to claim 1; and (g) upstream of the molecular sieve, removing mercury from the natural gas.

8. A process according to claim 7; and (h) downstream of the molecular sieve, cooling the natural gas in an ethylene chiller.

9. A process according to claim 8; and (i) downstream of the molecular sieve, cooling the natural gas in a propane chiller.

10. A process according to claim 7; and (j) upstream of the molecular sieve, cooling the natural gas in a propane chiller.

11. A process according to claim 10; and (k) upstream of the molecular sieve, cooling the natural gas in an ethylene chiller.

12. A process according to claim 11; and
(l) upstream of the molecular sieve, cooling the natural gas in the methane economizer.

13. A process according to claim 1,
said molecular sieve having a pore size in the range of about 3.6 to about 3.8 angstroms.

14. A process according to claim 1,
said molecular sieve having a pore size in the range of from 3.65 to 3.75 angstroms.

15. A process according to claim 1,
said molecular sieve being a titanium silicate zeolite.

16. A process according to claim 15,
said zeolite being selected from the group consisting of ETS-4, BaETS-4, CTS-1, and combinations thereof.

17. A process according to claim 1; and
(m) vaporizing the liquefied natural gas product produced via steps (a)–(c).

18. A liquefied natural gas product produced by the process of claim 1.

19. A natural gas liquefaction process comprising the steps of:
(a) adsorbing nitrogen from the natural gas, thereby providing a low-nitrogen natural gas stream;
(b) cooling at least a portion of the low-nitrogen natural gas stream in a propane chiller, thereby providing a first-stage chilled natural gas stream;
(c) cooling at least a portion of the first-stage chilled natural gas stream in an ethylene chiller, thereby providing a second-stage chilled natural gas stream; and
(d) using at least a portion of the second-stage chilled natural gas stream as a refrigerant in an open methane cycle.

20. A process according to claim 19,
said adsorbing being accomplished using a zeolite having a pore size in the range of from about 3.5 to about 4.0 angstroms.

21. A process according to claim 20; and
(e) upstream of the zeolite, pretreating the natural gas to remove at least one contaminant that interferes with the zeolite's ability to adsorb nitrogen.

22. A process according to claim 21,
said at least one contaminant being selected from the group consisting of hydrogen sulfide, carbon dioxide, water, mercury, and combinations thereof.

23. A process according to claim 22,
said zeolite having a pore size in the range of from about 3.6 to about 3.8 angstroms.

24. A process according to claim 20; and
(f) upstream of the zeolite, removing mercury from the natural gas.

25. A process according to claim 24; and
(g) upstream of the zeolite, removing at least one acid gas from the natural gas.

26. A process according to claim 25; and
(h) upstream of the zeolite, removing water from the natural gas.

27. A process according to claim 26,
said zeolite having a pore size in the range of from 3.65 to 3.75 angstroms, said zeolite being a titanium silicate zeolite.

28. A process according to claim 19; and
(i) vaporizing the liquefied natural gas product produced via steps (a)–(d).

29. A liquefied natural gas product produced by the process of claim 19.

30. A natural gas liquefaction process comprising the steps of:
(a) cooling the natural gas in a propane chiller, thereby providing a first-stage chilled natural gas stream;
(b) cooling at least a portion of the first-stage chilled natural gas stream in an ethylene chiller, thereby providing a second-stage chilled natural gas stream;
(c) cooling at least a portion of the second-stage chilled natural gas stream in a methane economizer, thereby providing a third-stage chilled natural gas stream;
(d) using at least a portion of the third-stage chilled natural gas stream as a refrigerant in the methane economizer; and
(e) adsorbing nitrogen from at least a portion of the natural gas used as a refrigerant in the methane economizer, thereby providing a low-nitrogen natural gas stream.

31. A process according to claim 30,
said adsorbing being accomplished using a zeolite having a pore size in the range of from about 3.5 to about 4.0 angstroms.

32. A process according to claim 31; and
(f) compressing at least a portion of the low-nitrogen natural gas stream, thereby providing a compressed natural gas stream.

33. A process according to claim 32; and
(g) cooling at least a portion of the compressed natural gas stream in the propane chiller.

34. A process according to claim 33; and
(h) upstream of the zeolite, pretreating the natural gas to remove at least one contaminant that interferes with the zeolite's ability to adsorb nitrogen.

35. A process according to claim 34,
said at least one contaminant being selected from the group consisting of hydrogen sulfide, carbon dioxide, water, mercury, and combinations thereof.

36. A process according to claim 35,
said zeolite having a pore size in the range of from about 3.6 to about 3.8 angstroms.

37. A process according to claim 33; and
(i) upstream of the zeolite, removing mercury from the natural gas.

38. A process according to claim 37; and
j) upstream of the zeolite, removing at least one acid gas from the natural gas.

39. A process according to claim 38; and
(k) upstream of the zeolite, removing water from the natural gas.

40. A process according to claim 39,
said zeolite having a pore size in the range of from 3.65 to 3.75 angstroms, said zeolite being a titanium silicate zeolite.

41. A process according to claim 30; and
(l) vaporizing the liquefied natural gas product produced via steps (a)–(e).

42. A liquefied natural gas product produced by the process of claim 30.

43. An apparatus for liquefying natural gas, said apparatus comprising:
a pretreatment system operable to remove at least one contaminant from the natural gas, said at least one contaminant being selected from the group consisting of an acid gas, water, mercury, and combinations thereof;

a nitrogen removal system disposed downstream of the pretreatment system and operable to remove nitrogen from the pretreated natural gas, said natural gas removal system including a molecular sieve having a pore size in the range of from about 3.5 to about 4.0 angstroms;

a propane chiller disposed downstream of the pretreatment system and operable to cool the natural gas;

an ethylene chiller disposed downstream of the propane chiller and operable to cool the natural gas; and a methane cycle system disposed downstream of the ethylene chiller.

44. An apparatus according to claim 43, said nitrogen removal system being disposed upstream of the open methane cycle system, said at least one contaminant including the acid gas.

45. An apparatus according to claim 44, said nitrogen removal system being disposed upstream of the ethylene chiller, said at least one contaminant including water.

46. An apparatus according to claim 45, said nitrogen removal system being disposed upstream of the propane chiller, said at least one contaminant including mercury.

47. An apparatus according to claim 43, said open methane cycle system including a methane compressor operable to compress the natural gas, said nitrogen removal system being disposed upstream of the methane compressor and downstream of the propane chiller.

48. An apparatus according to claim 47, said nitrogen removal system being disposed downstream of the ethylene chiller.

49. An apparatus according to claim 48, said methane cycle system including a high-stage methane flash drum disposed downstream of the ethylene chiller and upstream of the compressor, sad nitrogen removal system being fluidly disposed between the high-stage methane flash drum and the methane compressor.

50. A process according to claim 43, said molecular sieve having a pore size in the range of from 3.65 to 3.75 angstroms.

51. A process according to claim 43, said molecular sieve being a titanium silicate zeolite.

52. A process according to claim 51, said zeolite being selected from the group consisting of ETS-4, BaETS-4, CTS-1, and combinations thereof.

53. A process for liquefying natural gas, said process comprising the steps of:

(a) removing nitrogen from the natural gas using a molecular sieve having a pore size in the range of from about 3.5 to about 4.0 angstroms;

(b) cooling the natural gas in a first chiller; and (c) cooling the natural gas in a second chiller.

54. A process according to claim 53, said first chiller being a propane chiller, said second chiller being an ethylene chiller.

55. A process according to claim 53; and (d) cooling the natural gas in a methane economizer.

56. A process according to claim 53; and (e) downstream of the molecular sieve, the first chiller, and the second chiller, cooling the natural gas in a multi-stage expansion cycle.

57. A process according to claim 56, step (e) including reducing the temperature of the natural gas to a temperature of −240° F. to −260° F.

58. A process according to claim 57, step (e) including reducing the pressure of the natural gas stream to about atmospheric pressure.

59. A process according to claim 53, said first and second chillers being located downstream of the molecular sieve.

60. A process according to claim 59; and (f) upstream of the molecular sieve, removing an acid gas, water, and mercury from the natural gas.

61. A process according to claim 53; and (g) vaporizing the liquefied natural gas product produced via steps (a)–(c).

62. A liquefied natural gas product produced by the process of claim 53.

\* \* \* \* \*